(12) United States Patent
Smith et al.

(10) Patent No.: US 12,547,943 B2
(45) Date of Patent: Feb. 10, 2026

(54) SYSTEMS AND METHODS FOR RESOURCE ALLOCATION

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/609,927

(22) Filed: Mar. 19, 2024

(65) Prior Publication Data

US 2025/0299088 A1    Sep. 25, 2025

(51) Int. Cl.
*G06Q 40/00* (2023.01)
*G06N 20/00* (2019.01)

(52) U.S. Cl.
CPC ................................... *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 5,950,158 A * | 9/1999 | Wang | G10L 15/144 704/240 |
| 10,169,743 B2 | 1/2019 | Castel et al. | |
| 10,496,927 B2 * | 12/2019 | Achin | G06N 20/10 |
| 10,776,462 B2 | 9/2020 | Kursun et al. | |
| 10,938,655 B2 | 3/2021 | Murthy et al. | |
| 11,086,608 B2 | 8/2021 | Bequet et al. | |
| 11,315,014 B2 | 4/2022 | Dias et al. | |
| 11,379,646 B1 * | 7/2022 | Gonzalez | G06N 20/00 |
| 11,714,658 B2 | 8/2023 | Gardner et al. | |
| 2017/0214701 A1 | 7/2017 | Hasan | |
| 2020/0387754 A1 * | 12/2020 | Adelaar | G06F 9/54 |
| 2021/0049687 A1 * | 2/2021 | Abu Libda | G06F 16/245 |
| 2021/0157643 A1 | 5/2021 | Shear et al. | |

(Continued)

FOREIGN PATENT DOCUMENTS

| | | | | |
|---|---|---|---|---|
| CN | 114219338 | * | 3/2022 | ......... G06Q 10/0631 |
| CN | 114398178 | * | 4/2022 | ............. G06F 9/505 |

(Continued)

OTHER PUBLICATIONS

Macromoltek, Inc., "Machine Learning and Simulated Annealing," Medium, https://macromoltek.medium.com 2018 (Year: 2018).*

(Continued)

*Primary Examiner* — Abhishek Vyas
*Assistant Examiner* — William B. Bunker
(74) *Attorney, Agent, or Firm* — Caldwell Intellectual Property Law

(57) ABSTRACT

An apparatus for resource allocation, may include at least a processor; and a memory communicatively connected to the at least processor, wherein the memory contains instructions configuring the at least processor to receive a resource datum and a periodic activity pattern datum; identify input metadata as a function of the resource datum and the periodic activity pattern datum; select a resource allocation machine learning model as a function of the input metadata; and generate a resource allocation datum using the resource allocation machine learning model.

16 Claims, 7 Drawing Sheets

(56) References Cited

U.S. PATENT DOCUMENTS

| | | | |
|---|---|---|---|
| 2021/0166117 A1* | 6/2021 | Chu | G06N 3/08 |
| 2021/0286650 A1* | 9/2021 | Henry | G06F 9/5027 |
| 2022/0284369 A1 | 9/2022 | Woodhead et al. | |
| 2022/0318689 A1* | 10/2022 | Li-Bland | G06N 20/00 |
| 2022/0414530 A1* | 12/2022 | Cmielowski | G06N 20/00 |
| 2023/0005091 A1 | 1/2023 | Sastry | |
| 2023/0106369 A1 | 4/2023 | Flynn | |
| 2023/0315532 A1* | 10/2023 | Hoffmann | G06F 9/5027 |
| | | | 718/104 |
| 2023/0385692 A1* | 11/2023 | Kang | G06N 20/00 |
| 2023/0412604 A1 | 12/2023 | Pierce | |
| 2024/0028951 A1* | 1/2024 | Willardson | G06F 18/27 |
| 2024/0127080 A1* | 4/2024 | Kim | G06N 20/00 |

FOREIGN PATENT DOCUMENTS

| | | | | | |
|---|---|---|---|---|---|
| CN | 114661472 | * | 6/2022 | | G06F 9/5027 |
| CN | 118377617 | * | 7/2024 | | G06F 9/5027 |
| WO | WO-2019072200 A1 | * | 4/2019 | | G06F 18/2113 |
| WO | WO-2019217131 A1 | * | 11/2019 | | G06N 20/00 |
| WO | WO-2023128126 A1 | * | 7/2023 | | H04W 72/044 |

OTHER PUBLICATIONS

Will et al., "Privacy-Preserving Sharing of Data Analytics Runtime Metrics for Performance Modeling," arXiv:2403.05692v2 2024 (Year: 2024).*

Tang et al., "Multi-objective Resource Allocation Algorithm for Wireless Sensor Network Based on Improved Annealing," Ad Hoc and Sensor Wireless Networks, vol. 47 pp. 157-173 2020 (Year: 2020).*

Anonymous, "Test and Evaluation of Artificial Intelligence Models: What to Consider in a Test and Evaluation Strategy," CDAO, 2024 (Year: 2024).*

Yanoff et al., "Modeling model selection in model pluralism," Journal of Economic Methodology, vol. 25, No. 3 2016 (Year: 2016).*

Ding, L., Melodia, T., Batalama, S. N., & Matyjas, J. D. (2015). Distributed resource allocation in cognitive and cooperative ad hoc networks through joint routing, relay selection and spectrum allocation. Retrieved from https://www.sciencedirect.com/science/article/abs/pii/S1389128615000754.

Leipzig, J., Nüst, D., Hoyt, C. T., Ram, K., & Greenberg, J. (2021). The role of metadata in reproducible computational research. Patterns (New York, N.Y.), 2(9), 100322. https://doi.org/10.1016/j.patter.2021.100322.

* cited by examiner

SYSTEMS AND METHODS FOR RESOURCE ALLOCATION

FIELD OF THE INVENTION

The present invention generally relates to the field of machine learning. In particular, the present invention is directed to systems and methods for resource allocation.

BACKGROUND

Large scope machine learning models may require a large amount of training data and computation resources in order to complete a task with sufficient quality. Large scope models may be overly complex and detailed for a given task. While training smaller scope machine learning models may be more efficient, such a strategy may require several machine learning models in order to cover a sufficient breadth of tasks.

SUMMARY OF THE DISCLOSURE

In an aspect, an apparatus for resource allocation may include at least a processor; and a memory communicatively connected to the at least processor, wherein the memory contains instructions configuring the at least processor to receive a resource datum and a periodic activity pattern datum; identify input metadata as a function of the resource datum and the periodic activity pattern datum; select a resource allocation machine learning model as a function of the input metadata; and generate a resource allocation datum using the resource allocation machine learning model.

In another aspect, a method of resource allocation may include using at least a processor, receiving a resource datum and a periodic activity pattern datum; using at least a processor, identifying input metadata as a function of the resource datum and the periodic activity pattern datum; using at least a processor, selecting a resource allocation machine learning model as a function of the input metadata; and using at least a processor, generating a resource allocation datum using the resource allocation machine learning model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for resource allocation. An apparatus may receive a resource datum and/or a periodic activity pattern datum. An apparatus may determine input metadata as a function of this data. Input metadata may include, for example, a format of inputs of resource allocation machine learning model. An apparatus may determine resource allocation machine learning model as a function of input metadata. For example, inputs, input formats, and an algorithm used to train resource allocation machine learning model may be determined as a function of input metadata. Resource allocation machine learning model may also be determined as a function of a desired output, such as optimization objectives and/or constraints. Resource allocation machine learning model may be used to determine resource allocation datum, which may be used to allocate a resource.

Figure 1:
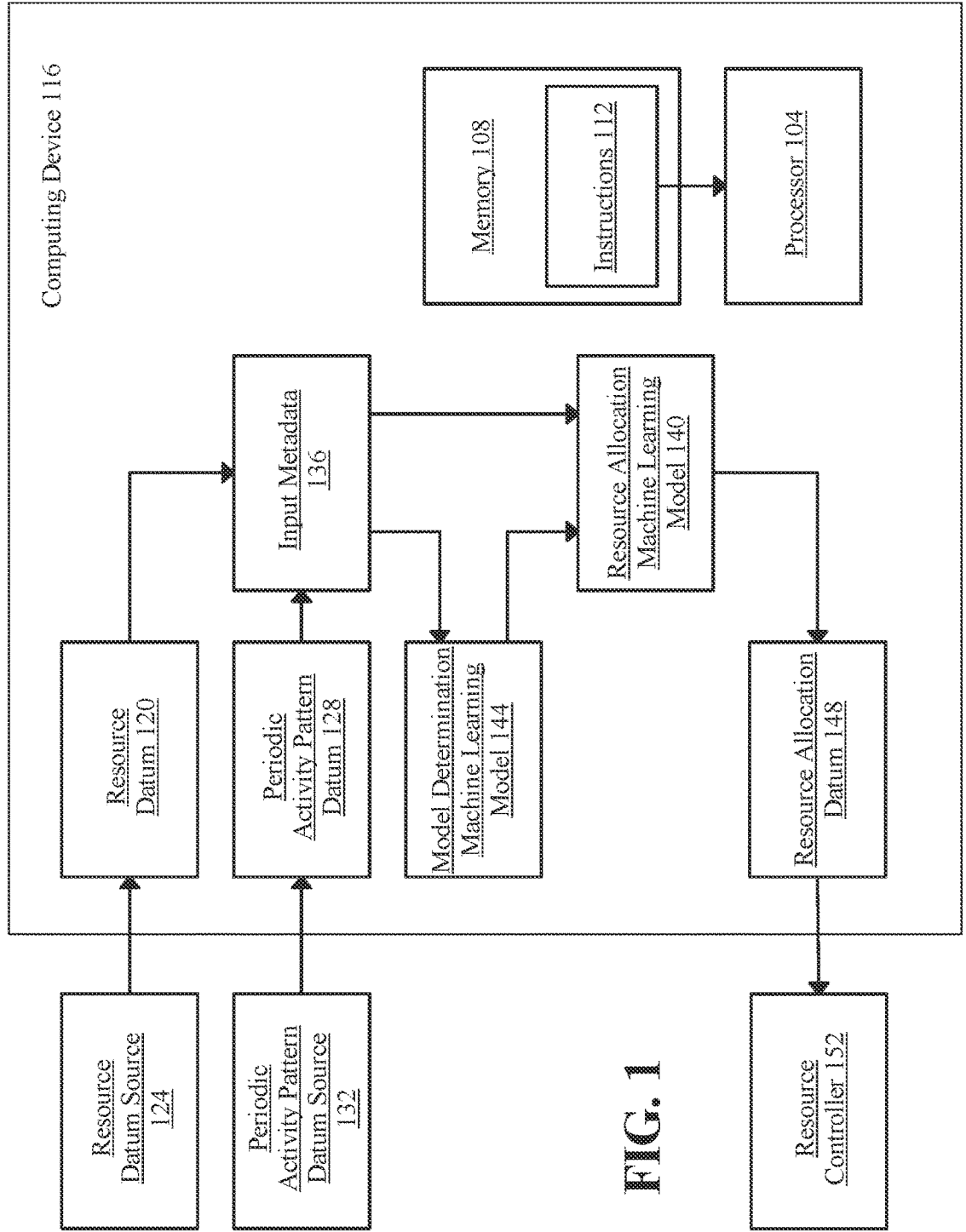
FIG. 1 is a diagram depicting an exemplary apparatus for resource allocation.

Referring now to FIG. 1, an exemplary embodiment of an apparatus 100 for resource allocation is illustrated. Apparatus 100 may include a computing device. Apparatus 100 may include a processor. Processor may include, without limitation, any processor described in this disclosure. Processor may be included in computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

Still referring to FIG. 1, in some embodiments, apparatus 100 may include at least a processor 104 and a memory 108 communicatively connected to the at least a processor 104, the memory 108 containing instructions 112 configuring the at least a processor 104 to perform one or more processes described herein. Computing device 116 may include processor 104 and/or memory 108. Computing device 116 may be configured to perform one or more processes described herein.

Still referring to FIG. 1, computing device 116 may include but is not limited to, for example, a computing device or cluster of computing devices in a first location and a second computing device or cluster of computing devices in a second location. Computing device 116 may include one or more computing devices dedicated to data storage, security, distribution of traffic for load balancing, and the like. Computing device 116 may distribute one or more computing tasks as described below across a plurality of computing devices of computing device, which may operate in parallel, in series, redundantly, or in any other manner used for distribution of tasks or memory between computing devices. Computing device 116 may be implemented, as a non-limiting example, using a "shared nothing" architecture.

With continued reference to FIG. 1, computing device 116 may be designed and/or configured to perform any method, method step, or sequence of method steps in any embodiment described in this disclosure, in any order and with any degree of repetition. For instance, computing device 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may receive resource datum 120. As used herein, a "resource datum" is a datum describing a resource which may be employed to achieve a desired result. A resource may include, in non-limiting examples, a machine, computing device, user, or time of a machine, computing device, or user. Additional non-limiting examples include computer processing capacity and computer memory. In some embodiments, a resource datum may describe or identify a property of a resource. For example, a resource datum may describe a computing device as including a particular graphics processing unit (GPU). In another example, a resource datum may describe a user as having training in a particular computer programming language. In some embodiments, a resource datum may describe or identify a capability of a resource. For example, a resource datum may identify a computing device as being capable of training a neural network at a particular rate. In another example, a resource datum may describe a factory as capable of producing a certain number of parts of a particular type per day.

Still referring to FIG. 1, in some embodiments, apparatus 100 may receive resource datum 120 from resource datum source 124. As used herein, a "resource datum source" is a process, entity, user, memory, or data structure containing a resource datum. Resource datum source 124 may include, for example, a database which stores resource datum 120. In a non-limiting example, a third party may operate a database including resource datum 120, processor 104 may request resource datum 120 from the database using an application programming interface (API), and processor 104 may receive from the database, or a computing device associated with the database, resource datum 120. In another example, resources themselves may be resource datum sources. For example, a computing device may be a resource and May transmit to apparatus 100 resource datum 120 identifying how much memory it has available, which processing components it has, which software is installed on it, and the like. In some embodiments, apparatus 100 may receive multiple instances of resource datum 120, such as from multiple resource datum sources 124. For example, several computing devices of differing types which may be allocated toward the same objective may be resource datum sources 124 and may each transmit resource datum 120 to apparatus 100, such as resource datum 120 identifying properties and/or capabilities of a computing device in question.

Still referring to FIG. 1, in some embodiments, resource datum 120 may be received based on user input. In some embodiments, resource datum source 124 may include one or more user devices, computing devices, and/or users. In non-limiting examples, user devices may include smartphones, smartwatches, tablets, and computers. In some embodiments, a resource datum source 124 may include a physical or digital form such as a form on a website or in an application. Exemplary forms include forms collecting information as to a skillset of a user.

Still referring to FIG. 1, resource datum 120 may be received through an interface. An interface may include a graphical user interface (GUI). An interface may include a touch-screen GUI interface. An interface may include a computing device configured to receive an input from a user. In some embodiments. an interface may be configured to prompt a user for an input. In a non-limiting example, an interface may request that a user input information as to the user's academic background.

Still referring to FIG. 1, in some embodiments, apparatus 100 may receive periodic activity pattern datum 128. As used herein, a "periodic activity pattern datum" is a datum which describes typical work performed by a resource. For example, a computing device may be partially used to perform a necessary task, but may be partially unutilized; in this case, periodic activity pattern datum 128 may describe the amount of processing power or memory typically used over a certain time frame in order to perform the necessary task. As described below, periodic activity pattern datum 128 may be used to identify availability of an associated resource. Periodic activity pattern datum 128 may be received from periodic activity pattern datum source 132. As used herein, a "periodic activity pattern datum source" is a process, entity, user, memory, or data structure containing a periodic activity pattern datum. Periodic activity pattern datum source 132 may include a device, user, or other entity described above in the context of resource datum source 124. For example, a computing device may communicate to apparatus 100 properties of itself as well as regular tasks scheduled for it to perform.

Still referring to FIG. 1, in some embodiments, apparatus 100 may receive a limited activity pattern datum. As used herein, a "limited activity pattern datum" is a datum which describes work performed by a resource, where a limited number of instances of such work is to be performed by the resource. In some embodiments, apparatus 100 may use limited activity pattern datum to identify availability of an associated resource, and/or determine input metadata as described herein similarly to periodic activity pattern datum 128.

Still referring to FIG. 1, in some embodiments, a resource may be identified using in a manner consistent with data collection and/or processing disclosed in U.S. patent application Ser. No. 18/141,296, filed on Apr. 28, 2023, and titled "SYSTEMS AND METHODS FOR DATA STRUCTURE GENERATION," the entirety of which is hereby incorporated by reference.

Still referring to FIG. 1, in some embodiments, a datum such as resource datum 120 and/or periodic activity datum 128 may be converted into a different form. Data formats may be converted in a variety of ways, such as without limitation, using a speech to text function or using optical character recognition. In some embodiments, a datum such as resource datum 120 and/or periodic activity datum 128 may be converted into a different form such that it is in a form appropriate for input into a function. As a non-limiting example, a machine learning model may only accept inputs in a particular format, and a datum such as resource datum 120 and/or periodic activity pattern datum 128 may be converted into that format such that it may be effectively input into the machine learning model.

Still referring to FIG. 1, data may also be altered such that it retains the same format but is more likely to produce successful or relevant results. As a non-limiting example, a machine learning model may be used to replace obscure words in a text file with more common words that have similar or identical meanings. In this example, this may be done by training a machine learning model on samples of text using unsupervised learning such that the machine learning model learns associations between words (such as based on how frequently they are used together). In this example, words may be represented as vectors with dimensions indicating their relationship to other words, and whether words are synonyms may be determined based on how similar their vectors are (as in, if vectors representing 2 words point in the same direction, those words may be synonyms). In this example, a first word determined to be similar to or a synonym of a second word, may be replaced by the second word. For example, resources may include several computing devices, associated resource data 124 associated with such computing devices may include hardware of such computing devices, and apparatus 100 may alter such resource data 124 such that hardware is described consistently and/or in the same format for each computing device.

Still referring to FIG. 1, in some embodiments, apparatus 100 may identify input metadata 136 as a function of resource datum 120 and/or periodic activity datum 128. As used herein, "input metadata" is data describing an input into a machine learning model, data describing training data used to train a machine learning model, or both. In some embodiments, input metadata 136 may include a datum identifying a number of inputs into a machine learning model. For example, a machine learning model may receive as an input data identifying multiple properties of a computing device resource, and input metadata 136 may specify a number of inputs sufficient to cover those properties. In some embodiments, input metadata 136 may include a datum specifying an attribute of a machine learning model input. In non-limiting examples, input metadata 136 may include a format of an input, or a data size of an input. In some embodiments, input metadata 136 may specify data to be described in an input. In some embodiments, input metadata 136 may specify an order in which data is to be input into a machine learning model.

Still referring to FIG. 1, apparatus 100 may determine input metadata 136 as a function of resource datum 120. Different numbers of input data or different input data formats may be appropriate for different resources described by resource datum 120. For example, resource datum 120 describing a user's time may lead to input metadata 136 indicating inputs include a list of subjects in which the user has training, and a datum indicating how much time the user has to allocate, whereas resource datum 120 describing a computing device may lead to input metadata 136 indicating inputs include an amount of memory and/or processing power available.

Still referring to FIG. 1, in some embodiments, a plurality of data points may be used to determine input metadata 136. For example, a first resource datum may describe properties of a computing device, and a second resource datum may describe properties of a second computing device; in this case, input metadata 136 may be determined such that inputs are appropriate for describing computer properties, capabilities, and the like. In another example, a first resource datum may describe properties of a computing device, and a second resource datum may describe output capacity of a manufacturing plant; in this case, input metadata 136 may be determined such that inputs suitable for describing both resources may be included.

Still referring to FIG. 1, in some embodiments, input metadata 136 may be determined as a function of a size of a training dataset, properties of a training dataset, and/or a size of a set of resource data 120. Different machine learning algorithms may be better suited for training on datasets with different properties, such as dataset size, or dataset dimensionality. In some embodiments, input metadata 136 may be determined based on a number of resource data 120 available.

Still referring to FIG. 1, in some embodiments, apparatus 100 may use a set of rules to determine input metadata 136. For example, a rule may determine input metadata 136 to include predetermined inputs suitable for describing a computing device if resource datum 120 includes a property of a computing device. In another example, a rule may determine input metadata 136 to not include inputs which do not describe a resource datum 120 received by apparatus 100.

Still referring to FIG. 1, in some embodiments, apparatus 100 may determine input metadata 136 as a function of periodic activity pattern datum 128 and/or limited activity pattern datum. For example, periodic activity pattern datum 128 may indicate that a resource has low availability. For example, periodic activity pattern datum 128 may indicate that a resource has less than about 10%, 20%, 30%, 40%, 50%, 60%, 70%, 80%, 90%, or 100% availability. How availability is measured may depend on the resource in question, and/or a task to be performed. For example, a computing device's availability may be measured by the amount of memory available to store data. In another example, a user's availability may be measured by the amount of time a user has available. In some embodiments, apparatus 100 may determine input metadata 136 disregarding one or more resources with an associated periodic activity pattern datum 128 indicating that the resource has low availability. In some embodiments, apparatus 100 may approximate resources needed to perform periodic activity pattern datum 128 associated actions and may remove such resources from consideration when determining input metadata 136. In some embodiments, apparatus 100 may optimize input metadata 136 for characterization, optimization, or the like of high availability resources over low availability resources, determined based on periodic activity pattern datum 128 and/or limited activity pattern datum. For example, a first potential element of input metadata may describe a property of a first resource with limited availability, a second potential element of input metadata may describe a property of a second resource with higher availability, and apparatus 100 may determine input metadata 136 to include the second potential element of input metadata and not the first element of input metadata.

Still referring to FIG. 1, in some embodiments, apparatus 100 may select resource allocation machine learning model 140 as a function of input metadata 136. Apparatus 100 may determine a training algorithm suitable for those inputs. Resource allocation machine learning model 140 may also be determined as a function of one or more properties of a training dataset, such as its size. Resource allocation machine learning model 140 may also be determined as a function of a desired output. In some embodiments, a decision tree may be used to determine resource allocation machine learning model 140. Which result is selected from a decision tree may be determined using input metadata 136.

Still referring to FIG. 1, in some embodiments, apparatus 100 may determine information entropy associated with inputs based on resource datum 120, periodic activity datum 128, limited activity datum, and/or input metadata 136. As used herein, "information entropy" is a level of information associated with a variable's potential outcomes. In some embodiments, apparatus 100 may identify a statistical likelihood of one or more potential inputs conforming with input metadata 136. Inputs with a high likelihood may be determined to convey a low amount of information, while inputs with a low likelihood may be determined to convey a high amount of information. For example, resources may include computing devices, and input metadata 136 may identify an input describing an amount of memory available in a computing device. In this example, a first amount of memory may be more common across a population of computing devices than a second amount of memory, and apparatus 100 may determine an input indicating that a resource has the first amount of memory to have lower information content than an input indicating that a resource has the second amount of entropy. In some embodiments, a maximum entropy of an input may be determined based on a number of possible outcomes of the input. For example, if a population of computing devices has only 2 potential amounts of available memory, then an input identifying which of the 2 potential amounts a resource including such a computing device has may be determined to convey less information than a similar input with 8 potential amounts of available memory. In some embodiments, information entropy associated with an input may be used to determine a minimum amount of information necessary to convey a property associated with the input. Input metadata 136 may be determined and/or modified based on such minimum amount of information. For example, if a population of computing devices has only 2 potential amounts of available memory, then input metadata identifying an amount of available memory of a resource including a computing device may include a single byte. Such compressed elements of training data and/or inputs into a machine learning model may be determined by, for example, identifying how many which of a number of potential outcomes resource datum 120 describes, and selecting an associated compressed element of training data and/or input.

Still referring to FIG. 1, in some embodiments, resource allocation machine learning model 140 may be determined using model determination machine learning model 144. Model determination machine learning model 144 may be trained using a supervised learning algorithm. model determination machine learning model 144 may include a classifier. Model determination machine learning model 144 may be trained on a training dataset including example input metadata, associated with example resource allocation machine learning model. Such a training dataset may be obtained by, for example, generating example input metadata as described above in the context of generating input metadata 136. In another example, a training dataset may be obtained by retrieving elements of training data from a database, such as a database described above. Once model determination machine learning model 144 is trained, it may be used to determine resource allocation machine learning model 140. Apparatus 100 may input one or more elements of input metadata 136 into model determination machine learning model 144, and apparatus 100 may receive resource allocation machine learning model 140 and/or a choice of model from model determination machine learning model 144. For example, model determination machine learning model 144 may output an algorithm and/or a choice of algorithm to be used to train resource allocation machine learning model 140.

Still referring to FIG. 1, in some embodiments, model determination machine learning model 144 may be trained using a reinforcement learning algorithm. For example, model determination machine learning model 144 may be given inputs such as input metadata 136, and model determination machine learning model 144 may be adjusted based on a cost function, where the cost function is based on the model's output. Such a cost function may take into account, for example, user feedback, computational cost of training resource allocation machine learning model 140 using an output algorithm, expected quality of resource allocation machine learning model 140 output, a degree to which resource allocation machine learning model 140 conforms to industry norms for such a problem and/or manual assessment of input metadata 136 by humans.

Still referring to FIG. 1, in some embodiments, apparatus 100 may select resource allocation machine learning model 140 having a limited scope. In some embodiments, a specialized machine learning model may be better suited to perform a specific task than a generalized machine learning model when similar amounts of computational resources are devoted to training them. In some embodiments, a specialized machine learning model may be able to perform a specific task to a desired level of quality while using less computational resources than a generalized machine learning model. Apparatus 100 may identify a plurality of resource allocation machine learning models and may select resource allocation machine learning model 140 from these based on model scope. A plurality of resource allocation machine learning models may be generated by, for example, inputting multiple sets of input metadata 136 into model determination machine learning model 144, and/or applying a set of rules to input metadata for generating one or more resource allocation machine learning models. Apparatus 100 may select resource allocation machine learning model 140 from a plurality of resource allocation machine learning models based on their scope. For example, a model with a minimum scope may be selected. For example, a first potential resource allocation machine learning model may be suitable for allocating resources including both processing power and human time, and a second potential resource allocation machine learning model may be suitable for allocating resources including only processing power; in this example, apparatus 100 may select the second potential resource allocation machine learning model in a situation in which all available resources and/or a majority of available resources include computing devices. Resource allocation machine learning model scope may include, in non-limiting examples, breadth of resources which resource allocation machine learning model is suitable for allocating, breadth of resource properties which resource allocation machine learning model inputs are suitable for characterizing, and breadth of outputs which resource allocation machine learning model is suitable for producing.

Still referring to FIG. 1, in some embodiments, apparatus 100 may generate resource allocation datum 148. As used herein, a "resource allocation datum" is a datum describing how a resource is to be allocated. Resource allocation datum 148 may be determined as a function of resource datum 120, periodic activity pattern datum 128, and/or a desired output or objective. For example, resource allocation may be optimized for one or more of a variety of variables. Such variables may depend on the specific resources and objectives involved. For example, a resource may include computer processing power, and resources may be allocated in order to optimize the speed at which a processing task is accomplished. In another example, a resource may include machinery for manufacturing goods, and resource allocation may be optimized for minimal power consumption associated with a manufacturing task. As another example, manufacturing machinery may be optimized such for manufacturing task speed, within certain power constraints.

Still referring to FIG. 1, in some embodiments, apparatus 100 may generate resource allocation datum 148 using resource allocation machine learning model 140. Resource allocation machine learning model 140 may be trained using an algorithm selected as described above. Such algorithm may include, in non-limiting examples, an unsupervised learning algorithm, a supervised learning algorithm, and a reinforcement learning algorithm. Resource allocation machine learning model 140 may include, in non-limiting examples, a regression model, a classifier, and a generative machine learning model. Resource allocation machine learning model 140 may be trained on a training dataset including a plurality of example resource data and example periodic activity pattern data as inputs correlated to a plurality of example resource allocation data as outputs. Such a training dataset may be obtained as described above. Once resource allocation machine learning model 140 is trained, it may be used to determine resource allocation datum 148. Apparatus 100 may input resource datum 120 and periodic activity pattern datum 128 into resource allocation machine learning model 140, and apparatus 100 may receive resource allocation datum 148 from the model.

Still referring to FIG. 1, in some embodiments, input metadata may include an input format, and training data used to train resource allocation machine learning model 140 may conform to that input format. For example, resource datum 120 and/or periodic activity pattern datum 128 may conform to such an input format. For example, an input may be formatted as containing a certain number of bytes of information. In another example, an input may be formatted as a particular datum type, such as an int, string, float, or the like. In another example, an input may be formatted as a particular file type, such as a PDF file, a text file, a PNG file, and the like. In another example, a set of inputs may be input in a particular order. In another example, a set of inputs may include a consistent number of inputs.

Still referring to FIG. 1, in some embodiments, input metadata 136 may be determined as a function of a training dataset used to train resource allocation machine learning model 140. For example, input metadata 136 may include a number of instances of training data and dimensionality of training data in such training dataset, and apparatus 100 may determine resource allocation machine learning model to include an algorithm which may be efficiently trained using such number of instances of training data and dimensionality of instances of training data.

Still referring to FIG. 1, in some embodiments, apparatus 100 may receive a target datum, identify output metadata as a function of the target datum, and/or select the resource allocation machine learning model as a function of the output metadata. As used herein, a "target datum" is a datum describing a desired output. Target datum may include, for example, a format of a desired output, a data size of a desired output, and/or an identification of a question desired output is to answer. A target datum may include an optimization objective, such as direction to allocate resources such that an energy cost is minimized, an amount of time to perform a task is minimized, or the like. A target datum may include a constraint, such as a maximum amount of time to complete a task or a minimum number of parts to be produced. Resource allocation machine learning model 140 may be selected such that an output conforms to output metadata. Resource allocation machine learning model 140 training data may be selected such that resource allocation machine learning model 140 is trained to produce a desired output.

Still referring to FIG. 1, in some embodiments, apparatus 100 may allocate a resource as a function of resource allocation datum 148. Computing device 116 may transmit resource allocation datum 148 to resource controller 152.

Resource controller 152 may include a computing device communicatively connected to a resource. For example, resource controller 152 may be configured to determine functions performed by resources. For example, resource controller 152 may be configured to determine which computing functions are performed by a computing device, and/or which parts are manufactured in a factory. In another example, resource controller 152 may be configured to communicate with a user based on resource allocation datum 148. For example, resource controller 152 may display to a user a datum indicating how a resource is to be allocated. Remote controller 152 may communicate a datum to a user using, for example, a visual or audio format. In some embodiments, remote controller 152 may include a user device such as a smartphone, tablet, or computer, and/or may transmit data to a user device for display to a user. Apparatus 100 may communicate a visual element and/or visual element data structure including resource allocation datum 148 and/or a datum derived therefrom to remote controller 152. This may configure remote controller to display a visual element. As used herein, a device "displays" a datum if the device outputs the datum in a format suitable for communication to a user. For example, a device may display a datum by outputting text or an image on a screen or outputting a sound using a speaker.

Still referring to FIG. 1, in some embodiments, apparatus 100 may determine a visual element data structure for visual element display to a user. Devices such as computing device 116, resource controller 152, and/or a user device may display a visual element to a user as a function of a visual element data structure. A visual element data structure may include a visual element. As used herein, a "visual element" is a datum that is displayed visually to a user. In some embodiments, a visual element data structure may include a rule for displaying visual element. In some embodiments, a visual element data structure may be determined as a function of resource allocation datum 148. In some embodiments, a visual element data structure may be determined as a function of an item from the list consisting of resource datum 120, periodic activity pattern datum 128, input metadata 136, resource allocation machine learning model 140, and resource allocation datum 148. In a non-limiting example, a visual element data structure may be generated such that visual element describing or highlighting resource allocation datum 148 is displayed to a user. In another example, data describing an algorithm chosen for training resource allocation machine learning model 140 may be displayed to a user.

Still referring to FIG. 1, in some embodiments, visual element may include one or more elements of text, images, shapes, charts, particle effects, interactable features, and the like. For example, a visual element may include a chart depicting how resource allocation datum 148 allocates a plurality of resources.

Still referring to FIG. 1, a visual element data structure may include rules governing if or when visual element is displayed. In a non-limiting example, a visual element data structure may include a rule causing a visual element describing resource allocation datum 148 to be displayed when a user selects resource allocation datum 148 using a GUI.

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously.

Still referring to FIG. 1, a visual element data structure rule may apply to a single visual element or datum, or to more than one visual element or datum. A visual element data structure may categorize data into one or more categories and may apply a rule to all data in a category, to all data in an intersection of categories, or all data in a subsection of a category (such as all data in a first category and not in a second category). For example, multiple data points on allocation of multiple resources may be categorized together. A visual element data structure may rank data or assign numerical values to them. For example, ranks may be determined based on the urgency with which the associated visual elements are to be displayed to a user. A numerical value may, for example, measure the degree to which a first datum is associated with a category or with a second datum. For example, a numerical value may measure the degree to which 2 resources are associated. A visual element data structure may apply rules based on a comparison between a ranking or numerical value and a threshold. For example, a rule may be applied to visual elements sufficiently associated with allocation of computer resources. Rankings, numerical values, categories, and the like may be used to set visual element data structure rules. Similarly, rankings, numerical values, categories, and the like may be applied to visual elements, and visual elements may be applied based on them.

Still referring to FIG. 1, in some embodiments, visual element may be interacted with. For example, visual element may include an interface, such as a button or menu. In some embodiments, visual element may be interacted with using a user device such as a smartphone.

Still referring to FIG. 1, in some embodiments, apparatus 100 may transmit visual element data structure to resource controller 152 and/or a user device. In some embodiments, apparatus 100 may include at least a processor 104 and a memory 108 communicatively connected to the at least processor 104, the memory 108 containing instructions 112 configuring the at least processor 104 to transmit visual element data structure to resource controller 152 and/or a user device. In some embodiments, visual element data structure may configure resource controller 152 and/or a user device to display visual element. In some embodiments, visual element data structure may cause an event handler to be triggered in an application of resource controller 152 and/or a user device such as a web browser. In some embodiments, triggering of an event handler may cause a change in an application of resource controller 152 and/or a user device such as display of visual element.

Still referring to FIG. 1, in some embodiments, apparatus 100 may transmit visual element to a display. A display may communicate visual element to user. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user to input data into the display. Interactive elements may be configured to enable interaction between a user and a computing device. In some embodiments, a visual element data structure is determined as a function of data input by user into a display.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, a resource allocation data structure may include a string value representing text to output to a user. In some embodiments, data in a data structure may be organized in a linked list, tree, array, matrix, tenser, and the like. In a non-limiting example, instructions as to how several resources are to be allocated may be organized in an array. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date.

Still referring to FIG. 1, a data structure may be stored in, for example, memory 108 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 104. In a non-limiting example, a resource allocation data structure may be read and displayed to a user.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

Still referring to FIG. 1, in some embodiments, allocation of resources as described herein may allow for efficient distribution of tasks between varying computing devices, such as computing devices with different properties and/or different periodic activity pattern data. In some embodiments, allocation of resources as described herein may also improve efficiency of distribution of tasks between computer resources and non-computer resources such as user time.

Figure 2:
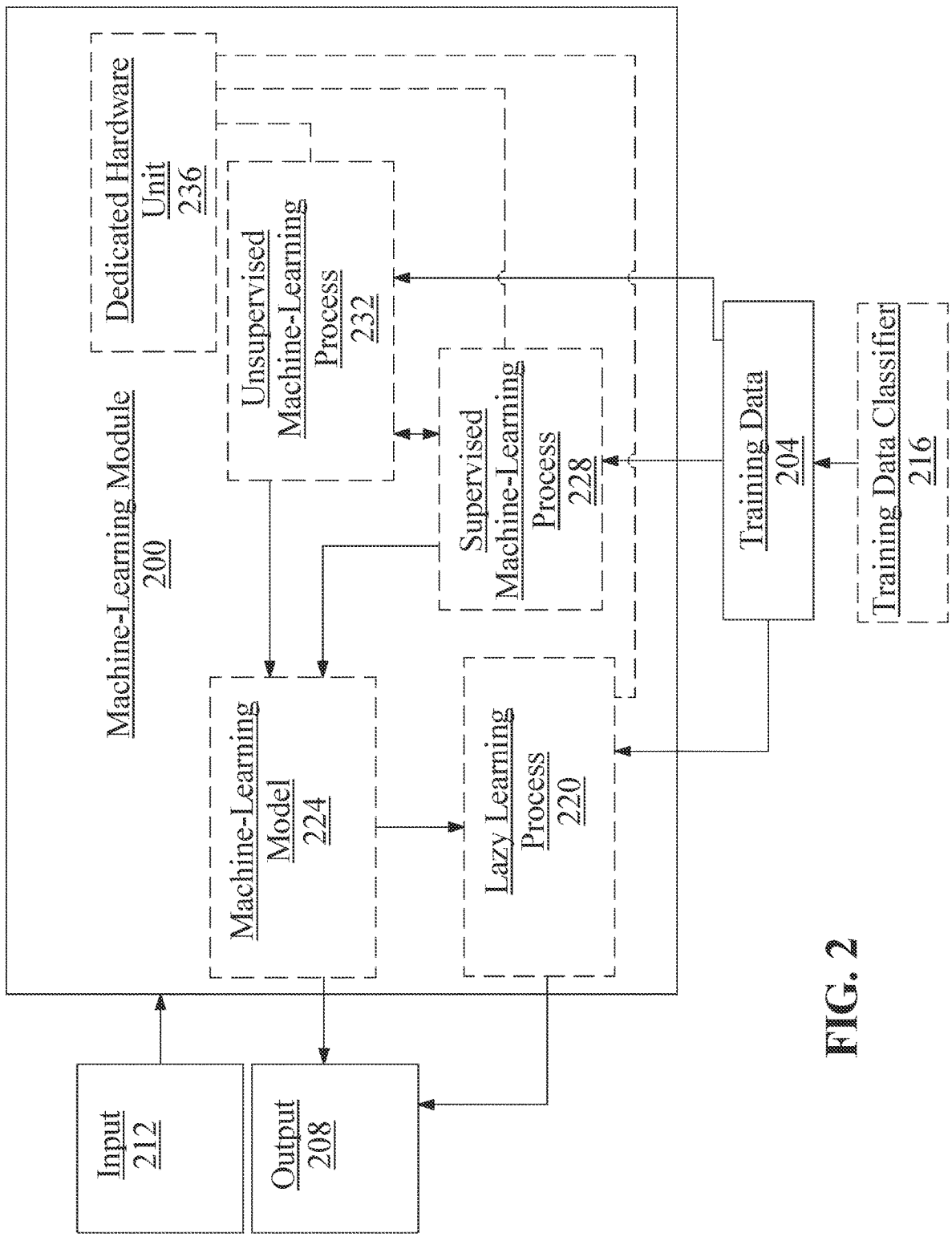
FIG. 2 is a box diagram of an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, an input may include input metadata 136 and an output may include resource allocation machine learning model 140.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to resource types such as computing devices and users.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input metadata 136 as described above as inputs, resource allocation machine learning model 140 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
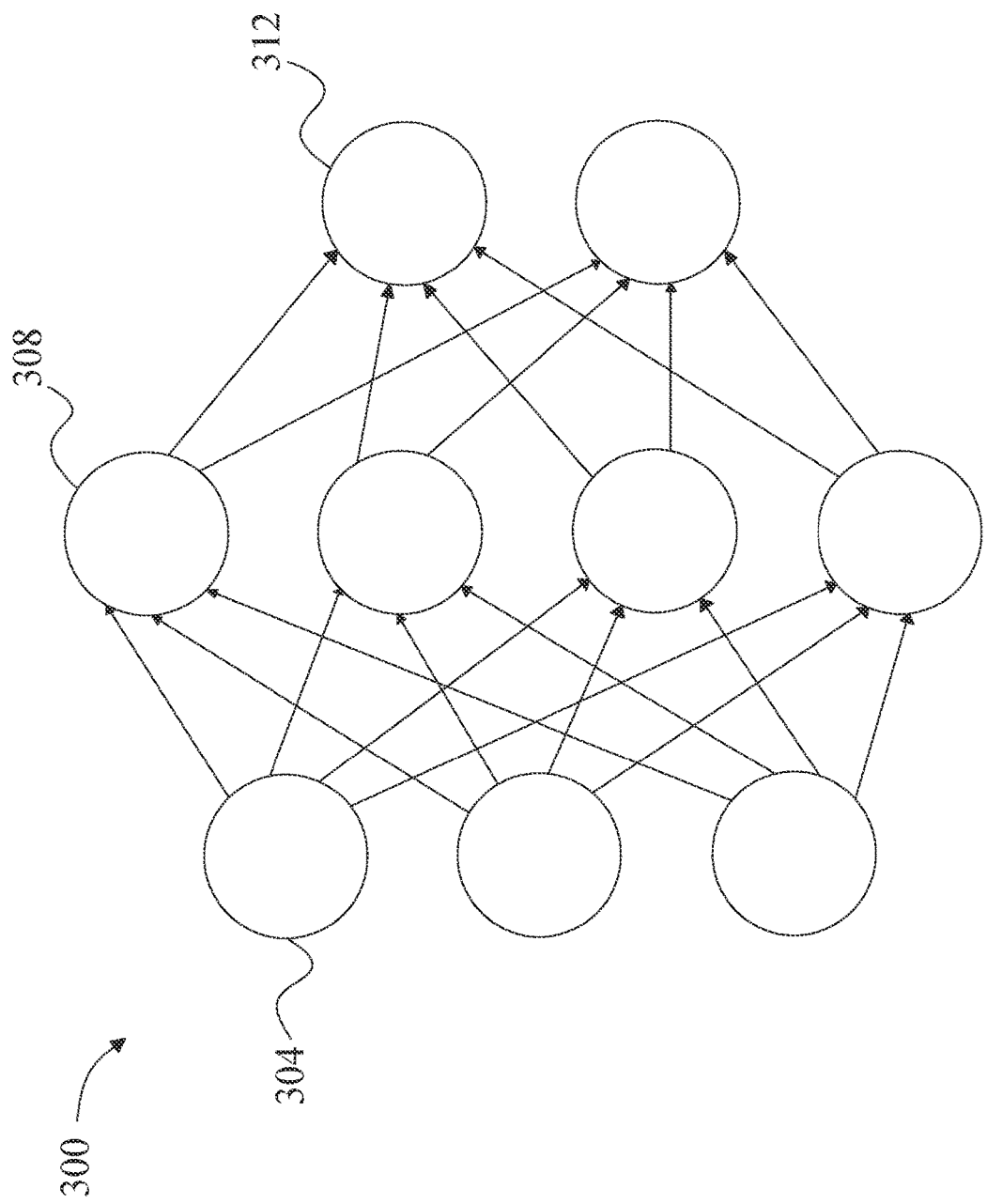
FIG. 3 is a diagram of an exemplary neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
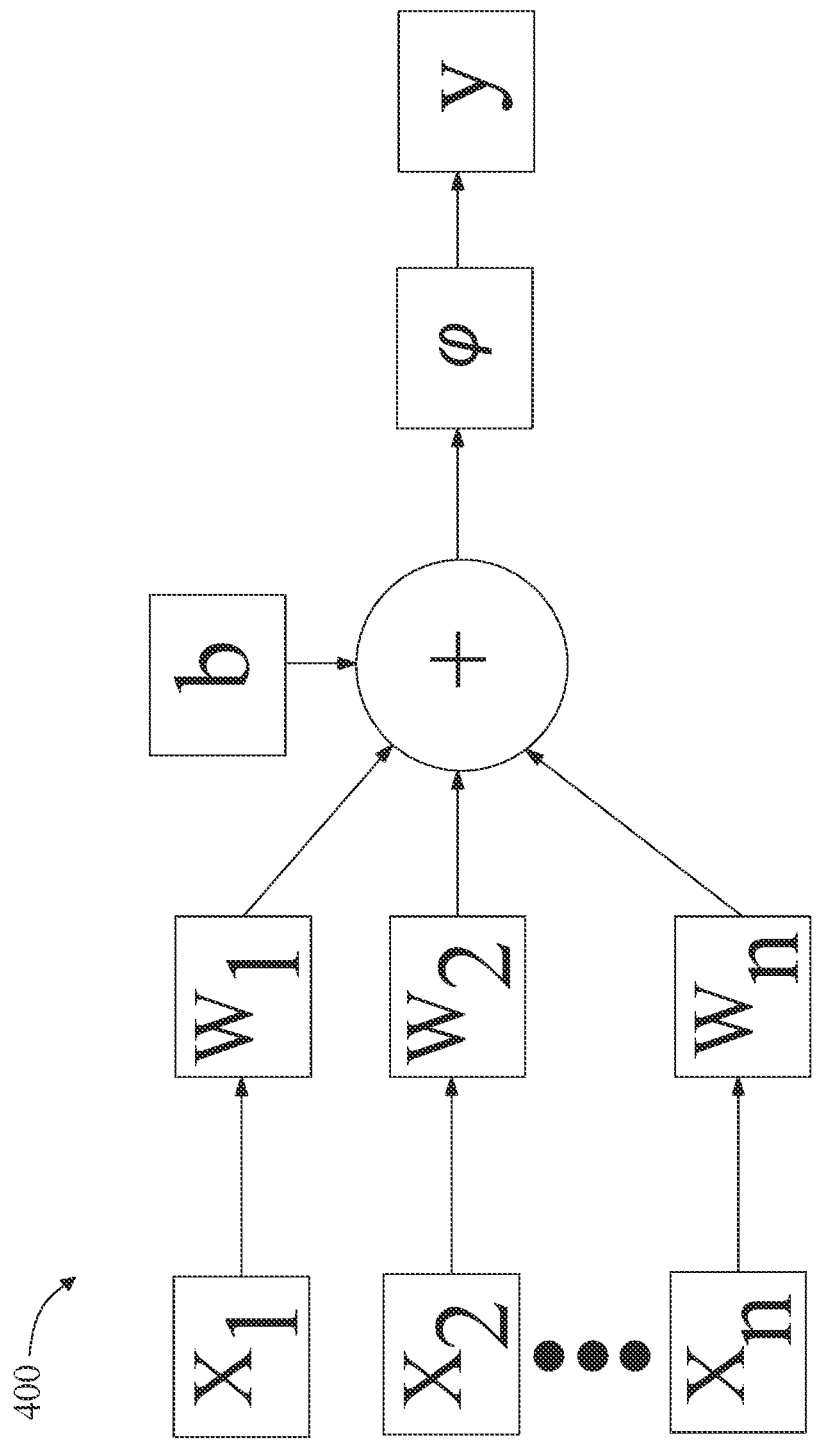
FIG. 4 is a diagram of an exemplary neural network node.

Referring now to FIG. 4, an exemplary embodiment of a node 400 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(\alpha x, x)$ for some $\alpha$, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\Sigma_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
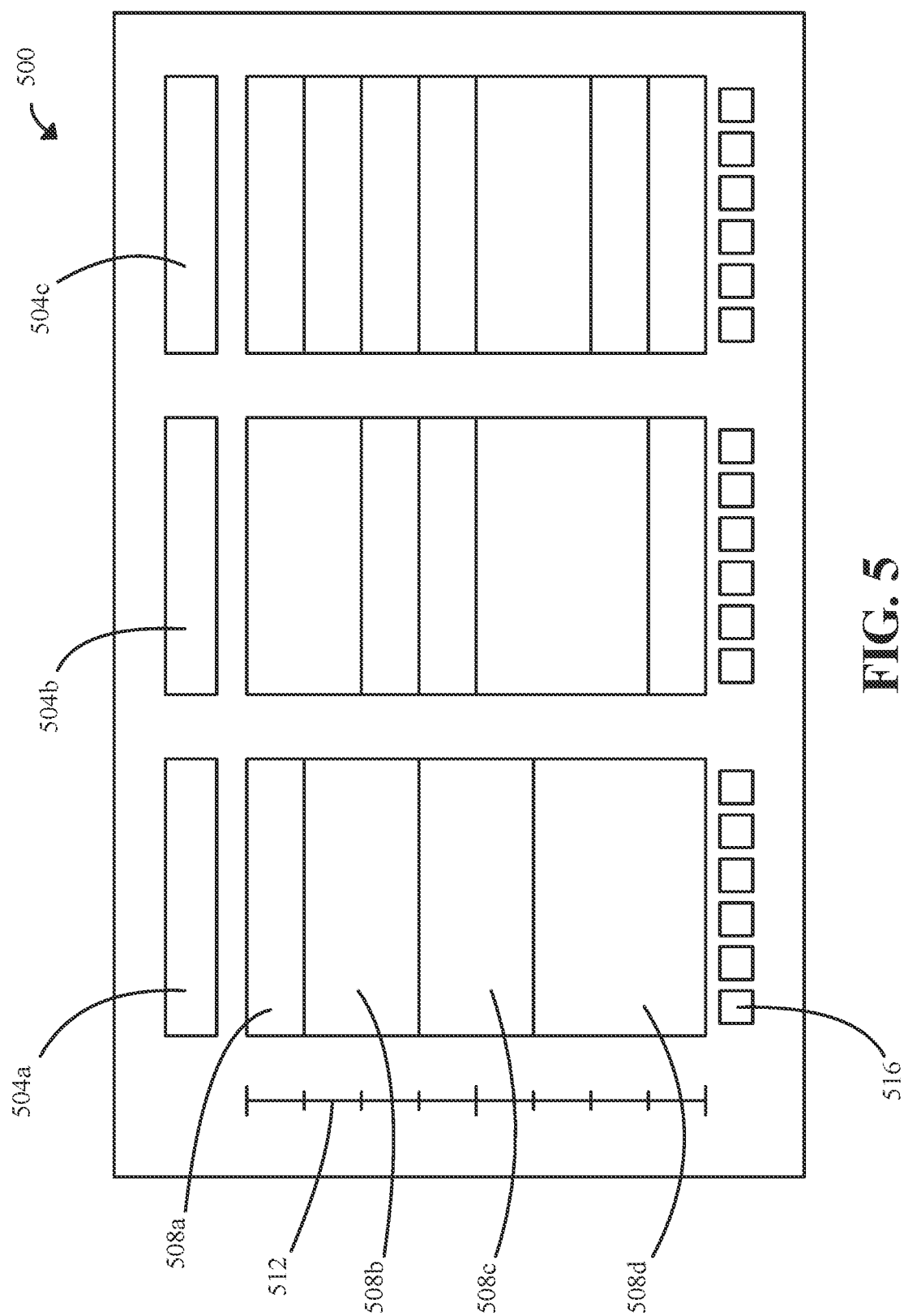
FIG. 5 is an illustration of an exemplary user interface.

Referring now to FIG. 5, an exemplary embodiment of a user interface 500 is illustrated. User interface 500 may include a graphical user interface, and may be displayed to a user, such as using a display, as described above with reference to FIG. 1. User interface 500 may communicate allocation of one or more resources to a user. For example, user interface 500 may include fields 504*a*, 504*b*, and/or 504*c*, each of which may identify one or more resources which are allocated as described herein. User interface 500 may include one or more fields associated with a resource, indicating allocation of that resource. For example, user interface 500 may include fields 508*a*, 508*b*, 508*c*, and/or

508d, which may identify how a resource identified in field 504a is allocated at varying points in time. For example, fields 508a, 508b, 508c, and/or 508d may include resource allocation datum 148. Fields 508a, 508b, 508c, and/or 508d may include allocation of resource 504a to a task associated with a periodic activity pattern. User interface 500 may include one or more additional fields identifying how a resource associated with field 504b and/or field 504c may be allocated. User interface 500 may include timeline 512. Timeline 512 may indicate timing of resource allocation of fields 508a, 508b, 508c, 508d, and/or a corresponding field associated with field 504b and/or field 504c. In some embodiments, user interface 500 may include interactive element 516. Interactive element 516 may allow a user to edit allocation of one or more resources, and/or adjust one or more parameters associated with determination of resource allocation datum 148. For example, a user may use interactive element 516 to adjust an order in which tasks are completed by a resource. In another example, a user may add a task to be completed. In another example, a user may instruct a computing device to recalculate resource allocation based on updated parameters. For example, recalculating resource allocation may include applying different inputs into resource allocation machine learning model 140 based on parameters set by a user and receiving a new resource allocation datum 148. In additional examples, a user may use interactive element 516 to change the priority of a task, add a resource, or remove a resource. An event handler may detect a user interaction with interactive element 516 and cause a computing device to recalculate a datum described herein based on updated parameters. User interface 500 may include one or more additional interactive elements. In some embodiments, an interactive element may be associated with one or more of fields 504a, 504b, or 504c.

Figure 6:
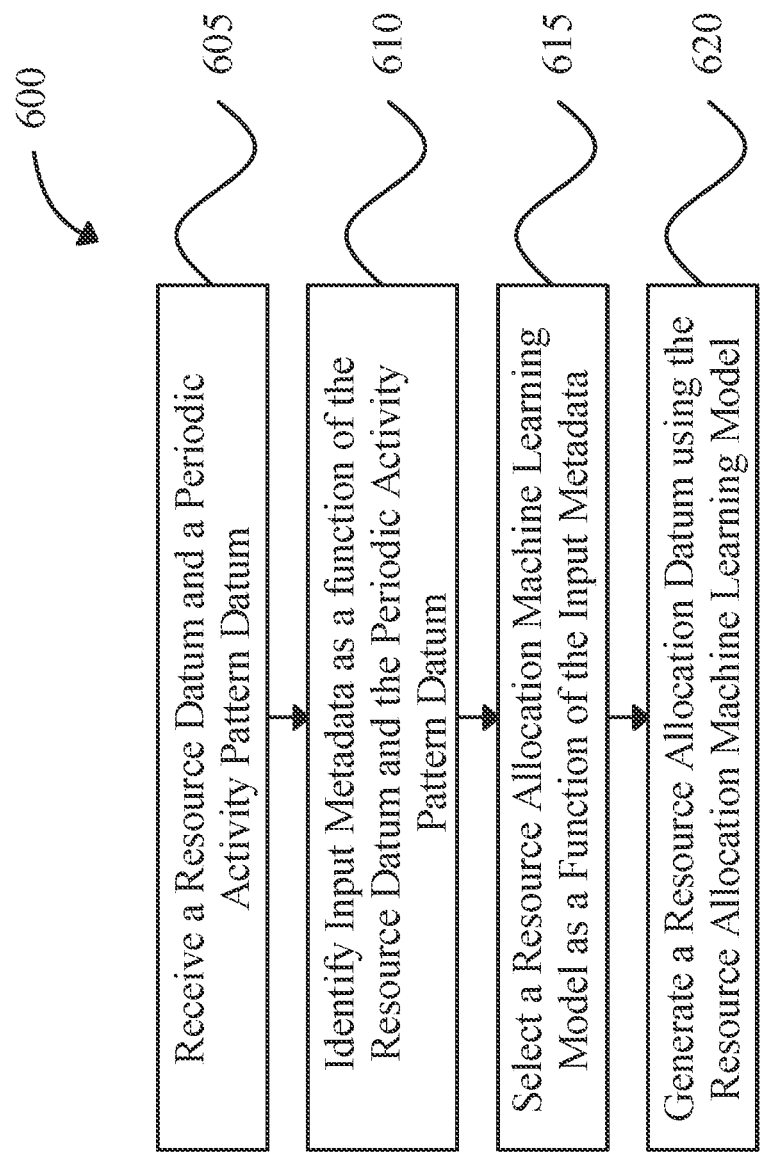
FIG. 6 is a diagram depicting an exemplary method of resource allocation.

Referring now to FIG. 6, an exemplary embodiment of a method 600 of resource allocation is illustrated. One or more steps if method 600 may be implemented, without limitation, as described with reference to other figures. One or more steps of method 600 may be implemented, without limitation, using at least a processor.

Still referring to FIG. 6, in some embodiments, method 600 may include receiving a resource datum and a periodic activity pattern datum 605.

Still referring to FIG. 6, in some embodiments, method 600 may include identifying input metadata as a function of the resource datum and the periodic activity pattern datum 610. In some embodiments, the input metadata is determined as a function of the training dataset; and wherein selecting the resource allocation machine learning model includes selecting a training algorithm as a function of the input metadata.

Still referring to FIG. 6, in some embodiments, method 600 may include selecting a resource allocation machine learning model as a function of the input metadata 615. In some embodiments, the resource allocation machine learning model may be selected using input metadata and a decision tree. In some embodiments, resource allocation machine learning model may be selected using input metadata and a model determination machine learning model. In some embodiments, selecting the resource allocation machine learning model may include training the model determination machine learning model on a training dataset including a plurality of example input metadata as inputs correlated to a plurality of example resource allocation machine learning models as outputs; and generating the resource allocation machine learning model as a function of the input metadata using the trained model determination machine learning model. In some embodiments, resource allocation machine learning model may be selected by generating a plurality of resource allocation machine learning models, ranking the plurality of resource allocation machine learning models according to model scope, and selecting a resource allocation machine learning model with a minimum scope. In some embodiments, the input metadata includes an input format; wherein the example resource data and the example periodic activity pattern data conform to the input format; and wherein the resource datum and the periodic activity pattern datum conform to the input format.

Still referring to FIG. 6, in some embodiments, method 600 may include generating a resource allocation datum using the resource allocation machine learning model 620. In some embodiments, generating the resource allocation datum using the resource allocation machine learning model may include training the resource allocation machine learning model on a training dataset including a plurality of example resource data and example periodic activity pattern data as inputs correlated to a plurality of example resource allocation data as outputs; and generating the resource allocation datum as a function of the resource datum and the periodic activity pattern datum using the trained resource allocation machine learning model.

Still referring to FIG. 6, in some embodiments, method 600 may further include receiving a target datum; identifying output metadata as a function of the target datum; and selecting the resource allocation machine learning model as a function of the output metadata.

Still referring to FIG. 6, in some embodiments, method 600 may further include allocating a resource associated with the resource datum as a function of the resource allocation datum.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
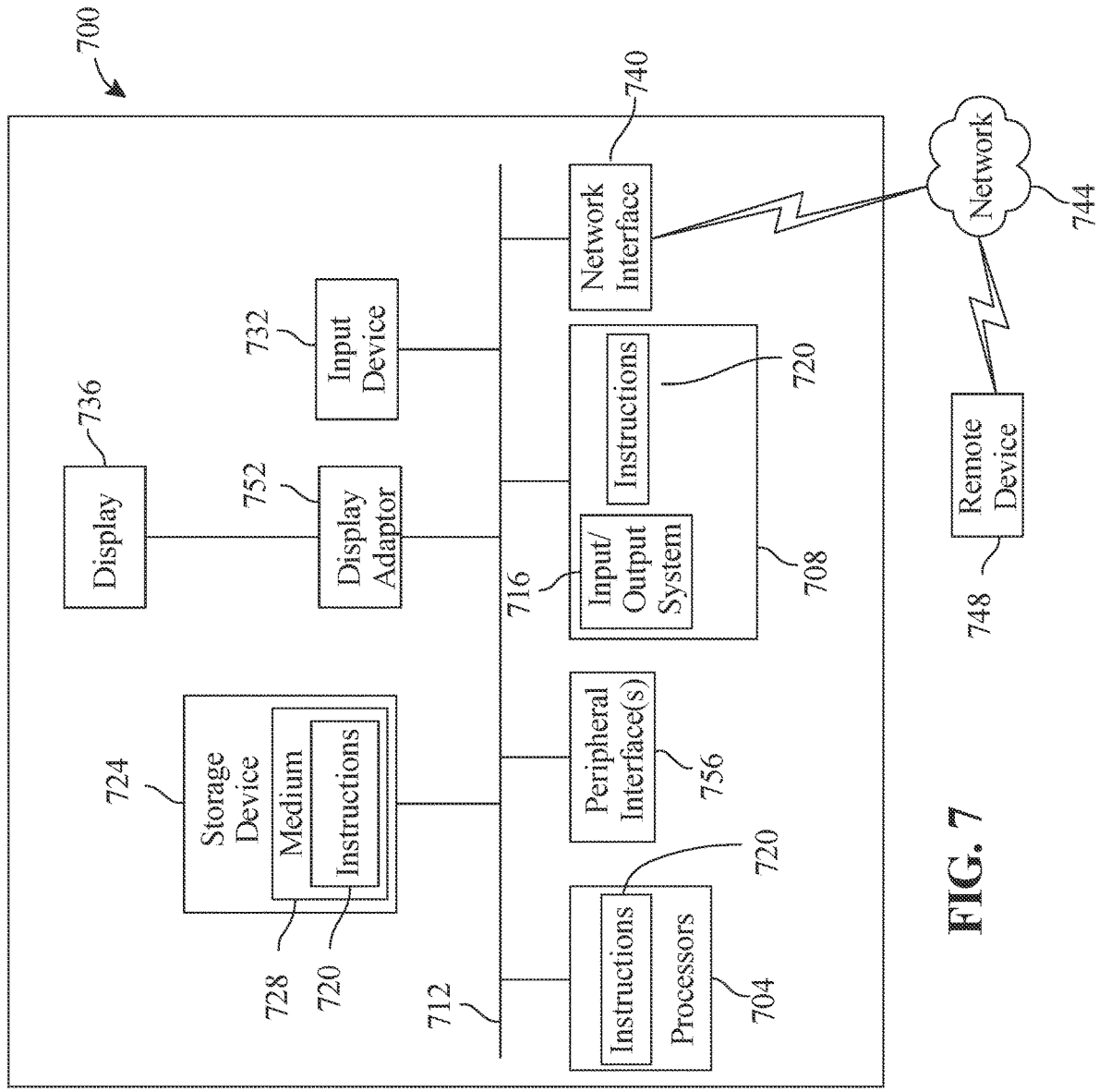
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for resource allocation for an efficient distribution of computational tasks among a plurality of computing devices with different properties and different periodic activity patterns, the apparatus comprising:
   at least a processor; and
   a memory communicatively connected to the at least processor, wherein the memory contains instructions configuring the at least processor to:
   receive, for each of the computing devices, a resource datum and a periodic activity pattern datum, wherein the resource datum for a particular computing device comprises characteristics of a computing capability of the computing device and the capability of a user of the device and wherein periodic activity pattern datum for the device comprises typical work performed by the device over a time frame;
   identify, for each of the computing devices, input metadata as a function of the resource datum and the periodic activity pattern datum, wherein the input metadata comprises training data usable for training a machine learning model;
   generate, specifically for each of the computing devices, a smaller scope a resource allocation machine learning model specifically trained for the properties and patterns of each computing device, wherein each specific resource allocation machine learning model comprises a neural network, wherein the generating uses a machine-learning module of the at least a processor, wherein generating each of the resource allocation machine learning models comprises:
   training a model determination machine learning model, wherein the determination model determines the specific resource allocation model for each computing device, wherein the training of the determination model uses a training dataset comprising a plurality of example input metadata for the plurality of computing devices as inputs correlated to a plurality of example resource allocation machine learning models as outputs, wherein the input metadata for the plurality of computing devices comprises:
   a number of inputs;
   an attribute of each input;
   an input format and data size;
   data to be described in each input; and
   an order in which data is to be input,
   wherein the input metadata further specifies a number of instances of training data and a dimensionality of the training data, wherein the at least a processor selects an algorithm for the resource allocation machine learning model to be trained using the specified number and dimensionality, and adjusts the determination machine learning model based on a cost function, wherein the cost function is based on user feedback; and
   generating, for a first computing device of the plurality of computing devices, a plurality of resource allocation machine learning models as a function of the input metadata using the trained model determination machine learning model, wherein each of the plurality of resource allocation machine learning models comprises a model of limited scope for performing a specific task using less computational resources;
   selecting, by the apparatus or a user, at least one of the generated limited scope resource allocation machine learning models to be used to allocate the computational resources of the first computing device;
   train the selected resource allocation machine learning model, wherein training the resource allocation machine learning model comprises:
   receiving training data comprising at least a target datum input correlated an output metadata;
   adjusting resource allocation machine learning model's parameters using the received training data and the cost function;
   comparing new outputs of the adjusted resource allocation machine learning model to the received training data;
   update the resource allocation machine learning model's parameters as a function of a comparison of the new outputs of the adjusted resource allocation machine learning model to the received training data, wherein updating the resource allocation machine learning model further comprises iteratively retraining the model based on user inputs indicating sub-optimal performance, wherein the user inputs indicating sub-optimal performance are based on an auditing process, and wherein the auditing process comprises comparing outputs of machine learning models, wherein the retraining comprises implementing a simulated annealing algorithm to adjust connections between nodes of a input layer of the neural network and an adjacent layer of neural network in order to generate an output, wherein adjusting the connections comprises using an interactive element, wherein the interactive element comprises a physical interactive element configured to enable interaction between the user and a computing device;

generate a resource allocation datum using the resource allocation machine learning model, wherein resource allocation datum describes how the computational resources of the first computing device are to be allocated;

transmit the resource allocation datum to a resource controller for the first computing device which is configured to determine functions of the first computing device;

generate a visual element data structure for displaying to a user the functions of the resource allocation datum, wherein the visual element data structure is ranked based on an urgency with which an associated visual element is displayed to a user;

display the visual element data structure on a graphical user interface, wherein the user interacts with the visual element data structure, wherein the interaction comprises an interactive element for editing or adjusting the allocation of resources for the first computing device, wherein the display comprises a plurality of fields associated with the computational resources of the first computing device correlated to a timeline.

2. The apparatus of claim 1, wherein generating the resource allocation machine learning model further comprises using the input metadata and a decision tree.

3. The apparatus of claim 1, wherein the memory contains instructions configuring the at least processor to generate the resource allocation machine learning model by generating a plurality of resource allocation machine learning models, ranking the plurality of resource allocation machine learning models according to a model scope, and selecting a resource allocation machine learning model with a minimum model scope.

4. The apparatus of claim 1, wherein generating the resource allocation datum using the resource allocation machine learning model comprises:

training the resource allocation machine learning model on a training dataset comprising a plurality of example resource data and example periodic activity pattern data as inputs correlated to a plurality of example resource allocation data as outputs; and generating the resource allocation datum as a function of the resource datum and the periodic activity pattern datum using the trained resource allocation machine learning model.

5. The apparatus of claim 4, wherein the example resource data and the example periodic activity pattern data conform to the input format of the input metadata; and wherein the resource datum and the periodic activity pattern datum conform to the input format.

6. The apparatus of claim 4, wherein the input metadata is determined as a function of the training dataset; and wherein generating the resource allocation machine learning model comprises selecting a training algorithm as a function of the input metadata.

7. The apparatus of claim 1, wherein the memory contains instructions configuring the at least processor to:

receive a target datum;

identify output metadata as a function of the target datum; and generate the resource allocation machine learning model as a function of the output metadata.

8. The apparatus of claim 1, wherein the memory contains instructions configuring the at least processor to allocate a resource associated with the resource datum as a function of the resource allocation datum.

9. A method of resource allocation for an efficient distribution of computational tasks among a plurality of computing devices with different properties and different periodic activity patterns, the method comprising:

using at least a processor, receiving, for each of the computing devices, a resource datum and a periodic activity pattern datum, wherein the resource datum for a particular computing device comprises characteristics of a computing capability of the computing device and the capability of a user of the device and wherein periodic activity pattern datum for the device comprises typical work performed by the device over a time frame;

using the at least a processor, identifying, for each of the computing devices, input metadata as a function of the resource datum and the periodic activity pattern datum, wherein the input metadata comprises training data usable for training a machine learning model;

using the least a processor, generating, specifically for each of the computing devices, a smaller scope resource allocation machine learning model specifically trained for the properties and patterns of each computing device, wherein each specific resource allocation machine learning model comprises a neural network, wherein the generating uses a machine-learning module of the at least a processor, wherein generating each of the resource allocation machine learning models comprises:

training a model determination machine learning model, wherein the determination model determines the specific resource allocation model for each computing device, wherein the training of the determination model uses a training dataset comprising a plurality of example input metadata for the plurality of computing devices as inputs correlated to a plurality of example resource allocation machine learning models as outputs, wherein the input metadata for the plurality of computing devices comprises:

a number of inputs;

an attribute of each input;

an input format and data size;

data to be described in each input; and an order in which data is to be input, wherein the input metadata further specifies a number of instances of training data and a dimensionality of the training data, wherein the at least a processor selects an algorithm for the resource allocation machine learning model to be trained using the specified number and dimensionality, and adjusts the determination machine learning model based on a cost function, wherein the cost function is based on user feedback; and generating, for a first computing device of the plurality of computing devices, a plurality of resource allocation machine learning models as a function of the input metadata using the trained model determination machine learning model, wherein each of the plurality of resource allocation machine learning models comprises a model of limited scope for performing a specific task using less computational resources;

using the least a processor, selecting at least one of the generated limited scope resource allocation machine learning models to be used to allocate the computational resources of the first computing device;

using the at least a processor, training a selected resource allocation machine learning model, wherein training the resource allocation machine learning model comprises:

receiving training data comprising at least a target datum input correlated an output metadata;

adjusting resource allocation machine learning model's parameters using the received training data and the cost function;

comparing new outputs of the adjusted resource allocation machine learning model to the received training data;

update the resource allocation machine learning model's parameters as a function of a comparison of the new outputs of the adjusted resource allocation machine learning model to the received training data, wherein updating the resource allocation machine learning model further comprises iteratively retraining the model based on user inputs indicating sub-optimal performance, wherein the user inputs indicating sub-optimal performance are based on an auditing process, wherein the auditing process comprises comparing outputs of machine learning models, wherein the retraining comprises implementing a simulated annealing algorithm to adjust connections between nodes of a input layer of the neural network and an adjacent layer of neural network in order to generate an output, wherein adjusting the connections comprises using an interactive element, wherein the interactive element comprises a physical interactive element configured to enable interaction between the user and a computing device;

using the at least a processor, generating a resource allocation datum using the resource allocation machine learning model, wherein resource allocation datum describes how the computational resources of the first computing device are to be allocated;

using the least a processor, transmitting the resource allocation datum to a resource controller for the first computing device which is configured to determine functions of the first computing device;

using the at least a processor, generating a visual element data structure for displaying to a user the functions of the resource allocation datum, wherein the visual element data structure is ranked based on an urgency with which an associated visual element is displayed to a user;

using the at least a processor, displaying the visual element data structure on a graphical user interface, wherein the user interacts with the visual element data structure, wherein the interaction comprises an interactive element for editing or adjusting the allocation of resources for the first computing device, wherein the display comprises a plurality of fields associated with the computational resources of the first computing device correlated to a timeline.

10. The method of claim 9, wherein the resource allocation machine learning model is generated using the input metadata and a decision tree.

11. The method of claim 9, wherein the resource allocation machine learning model is generated by generating a plurality of resource allocation machine learning models, ranking the plurality of resource allocation machine learning models according to a model scope, and selecting a resource allocation machine learning model with a minimum model scope.

12. The method of claim 9, wherein generating the resource allocation datum using the resource allocation machine learning model comprises:

training the resource allocation machine learning model on a training dataset comprising a plurality of example resource data and example periodic activity pattern data as inputs correlated to a plurality of example resource allocation data as outputs; and generating the resource allocation datum as a function of the resource datum and the periodic activity pattern datum using the trained resource allocation machine learning model.

13. The method of claim 12, wherein the example resource data and the example periodic activity pattern data conform to the input format; and wherein the resource datum and the periodic activity pattern datum conform to the input format.

14. The method of claim 12, wherein the input metadata is determined as a function of the training dataset; and wherein generating the resource allocation machine learning model comprises selecting a training algorithm as a function of the input metadata.

15. The method of claim 9, further comprising:

receive a target datum;

identify output metadata as a function of the target datum; and generate the resource allocation machine learning model as a function of the output metadata.

16. The method of claim 9, further comprising allocating a resource associated with the resource datum as a function of the resource allocation datum.

* * * * *